(12) United States Patent
Shibahara et al.

(10) Patent No.: US 9,160,002 B2
(45) Date of Patent: Oct. 13, 2015

(54) LEAD-ACID BATTERY

(75) Inventors: Toshio Shibahara, Tokyo (JP); Satoru Takahashi, Tokyo (JP); Yuuji Araki, Tokyo (JP); Masanori Sakai, Tokyo (JP); Satoshi Minoura, Tokyo (JP)

(73) Assignee: SHIN-KOBE ELECTRIC MACHINERY CO., LTD., Tokyo (JP)

( * ) Notice: Subject to any disclaimer, the term of this patent is extended or adjusted under 35 U.S.C. 154(b) by 228 days.

(21) Appl. No.: 13/818,761

(22) PCT Filed: Jan. 17, 2011

(86) PCT No.: PCT/JP2011/050667
§ 371 (c)(1),
(2), (4) Date: Feb. 25, 2013

(87) PCT Pub. No.: WO2012/042917
PCT Pub. Date: Apr. 5, 2012

(65) Prior Publication Data
US 2013/0157118 A1  Jun. 20, 2013

(30) Foreign Application Priority Data

Sep. 30, 2010 (JP) ................................ 2010-221859

(51) Int. Cl.
*H01M 4/583* (2010.01)
*H01M 4/14* (2006.01)
(Continued)

(52) U.S. Cl.
CPC ............... *H01M 4/583* (2013.01); *H01M 4/14* (2013.01); *H01M 4/62* (2013.01); *H01M 4/625* (2013.01);
(Continued)

(58) Field of Classification Search
CPC ...... H01M 10/121; H01M 10/06; H01M 4/14
USPC ........................................................ 429/163
See application file for complete search history.

(56) References Cited

U.S. PATENT DOCUMENTS 4,037,630 A * 7/1977 Foulkes .......................... 141/1.1
4,485,156 A * 11/1984 Tokunaga ...................... 429/204
(Continued)

FOREIGN PATENT DOCUMENTS

| JP | 3-15162 | 1/1991 |
| JP | 6-76815 | 3/1994 |

(Continued)

OTHER PUBLICATIONS

Shunhei Takeshima et al., Development of Compact VRLA FT7C-HEV for HEV-type Passenger Mini-car, FB Technical News, No. 60, Dec. 2004, pp. 13-17.

*Primary Examiner* — Stewart Fraser
*Assistant Examiner* — Olatunji Godo
(74) *Attorney, Agent, or Firm* — Fitch, Even, Tabin and Flannery LLP

(57) ABSTRACT

In a valve-regulated lead-acid battery in which charging is performed intermittently on every short time and high rate discharging to a load is performed in a partial state of charge (PSOC), a valve-regulated lead-acid battery improved for the charge acceptance and the life characteristic under PSOC than usual is provided. A positive electrode plate having a specific surface area of an active material of 5.5 m$^2$/g or more is used. A valve-regulated lead-acid battery is manufactured by using a negative electrode plate improved for the charge acceptance and the life performance by adding a carbonaceous electroconductive material and a formaldehyde condensate of bisphenols aminobenzene sulfonic acid to a negative electrode active material and setting the specific gravity of an electrolyte to 1.30 or more and 1.35 or less.

3 Claims, 1 Drawing Sheet

(51) Int. Cl.
   *H01M 4/62*   (2006.01)
   *H01M 10/12*  (2006.01)
   *H01M 10/44*  (2006.01)
   H01M 10/42   (2006.01)
   H01M 4/02    (2006.01)

(52) U.S. Cl.
   CPC ............ *H01M 10/121* (2013.01); *H01M 10/44* (2013.01); *H01M 10/4235* (2013.01); *H01M 2004/021* (2013.01); *H01M 2004/027* (2013.01); *Y02E 60/126* (2013.01); *Y02T 10/7016* (2013.01)

(56) References Cited

U.S. PATENT DOCUMENTS

| | | | |
|---|---|---|---|
| 5,314,766 A * | 5/1994 | Witherspoon et al. | 429/227 |
| 6,548,211 B1 * | 4/2003 | Kamada et al. | 429/225 |
| 2009/0325068 A1 * | 12/2009 | Boden et al. | 429/215 |
| 2010/0091430 A1 * | 4/2010 | Buiel et al. | 361/502 |
| 2013/0280595 A1 * | 10/2013 | Kogure et al. | 429/163 |

FOREIGN PATENT DOCUMENTS

| | | |
|---|---|---|
| JP | 6-104006 | 4/1994 |
| JP | 7-201331 | 8/1995 |
| JP | 10-40907 | 2/1998 |
| JP | 11-250913 | 9/1999 |
| JP | 2002-141066 | 5/2002 |
| JP | 2002-231247 | 8/2002 |
| JP | 2003-36882 | 2/2003 |
| JP | 2003-51306 | 2/2003 |
| JP | 2004-127585 | 4/2004 |
| JP | 2006-196191 * | 7/2006 |

* cited by examiner

LEAD-ACID BATTERY

TECHNICAL FIELD

The present invention concerns a valve-regulated lead-acid battery using pasted positive and negative electrode plates.

BACKGROUND ART

Lead-acid batteries are generally classified into flooded type and valve-regulated type and, since they have a feature of being inexpensive and highly reliable, they are generally used respectively as power sources for automobile starting, power sources for electromotive vehicles such as golf carts and, further, as power sources for industrial equipments such as uninterruptible power supplies.

In automobiles, various countermeasures have been studied in recent years for the improvement of fuel cost for preventing atmospheric pollution and preventing global warming. For automobiles applied with the countermeasure for the improvement of the fuel cost, studies have been made on micro hybrid vehicles such as idling stop and start vehicles (hereinafter referred to as ISS vehicles) for decreasing the engine operation time and generation control vehicles that efficiently utilize engine rotation to power.

In ISS vehicles, the number of engine starting times is increased and large current discharge from lead-acid battery is repeated on every time. Further, in the ISS vehicles or the generation control vehicles, since the amount of electric power generated by an alternator is decreased and the lead-acid battery is charged intermittently, the battery is often charged insufficiently. Accordingly, in the lead-acid battery used for the applications described above, a performance capable of performing charging as much as possible in a short time, that is, improvement for charge acceptance is required.

While it is necessary for valve-regulated lead-acid batteries to be mounted in a trunk room or the like where temperature is not high, they have advantages such as free of maintenance, long life, and vibration resistance compared with flooded lead-acid battery, and they have been mounted frequently in ISS vehicles made in Europe.

The lead-acid batteries used in the manner described above are used in a partially charged state referred to as PSOC (Partial State Of Charge). When the valve-regulated lead-acid battery is used under PSOC, the life tends to be shortened compared with the case of use in a completely charged state. It is considered that the life is shortened when used under PSOC because when charge and discharge are repeated in the insufficiently charged state, lead sulfate formed on the negative electrode upon discharge is grown and lead sulfate is less reduced to lead as the charging product. Accordingly, in the valve-regulated lead-acid battery used under PSOC, it is necessary, also for extending the life, to improve the charge acceptance (enabling charge as much as possible in a short time), thereby preventing repetitive charge and discharge in an excessively insufficient charged state to suppress lead sulfate from growing by repetitive charge and discharge.

As described above, in recent lead-acid batteries for vehicles, it is an extremely important subject to enable high rate discharging to the load by a short time charge, as well as improve the charge acceptance for improving the life performance of a battery when used under PSOC.

In the valve-regulated lead-acid battery, since the charge acceptance of a negative electrode active material is poor while charge acceptance of the positive electrode active material is high by nature, it is necessary to improve the charge acceptance of the negative electrode active material for improving the charge acceptance of the valve-regulated lead-acid battery. Therefore, efforts have been made exclusively so far to improve the charge acceptance of the negative electrode active material. Relevant related arts are shown below.

Patent Literature 1 and Patent Literature 2 propose to improve the charge acceptance by increasing the amount of a carbonaceous electroconductive material to be added to the negative electrode active material, thereby improving the life of lead-acid batteries used under PSOC. The proposals are directed to the valve-regulated lead-acid batteries as a target.

On the other hand, in the valve-regulated lead-acid batteries, organic compounds having an effect of suppressing growing of the negative electrode active material have been added to the negative electrode active material for keeping a high reactivity state in the charge and discharge reaction thereby suppressing growing of the negative electrode active material during charge and discharge and suppressing the decrease of the surface area of the negative electrode. Heretofore, as the organic compound for suppressing growing of the negative electrode active material, lignin which is a main ingredient of wood materials has been used. However, since the lignin has various structures in which multiple unitary structures are bonded in a complicate manner and usually has portions tending to undergo oxidation or reduction such as carbonyl groups, the portions are decomposed by oxidation or reduction during charge and discharge of the valve-regulated lead-acid battery. Therefore, even when the lignin is added to the negative electrode active material, the effect of suppressing the lowering of the performance by repetitive charge and discharge could not be maintained for a long time. Further, since the lignin is adsorbed to lead ions dissolving from lead sulfate to lower the reactivity of the lead ions upon charging, this results in a side effect of inhibiting the charge reaction of the negative electrode active material to suppress the improvement of the charge acceptance. Accordingly, the lignin added to the negative electrode active material involves a problem of hindering the improvement of the charge acceptability although it enhances the discharge characteristic.

With a view point described above, it has been proposed to add, instead of the lignin, sodium lignin sulfonate in which a sulfonic group is introduced to the α-position on the side chain of a phenyl propane structure which is a basic structure of the lignin, a formaldehyde condensate of bisphenols and aminobenzene sulfonic acid, etc. to the negative electrode active material.

For example, Patent Literatures 3 and Patent Literatures 4 disclose to add a folmaldehyde condensate of bisphenols aminobenzene sulfonic acid and a carbonaceous electroconductive material to the negative electrode active material. Particularly, the Patent Literatures 4 discloses that the effect of suppressing lead sulfate from growing is maintained by selecting the formaldehyde condensate of bisphenols aminobenzene sulfonic acid as an organic compound of suppressing lead sulfate from growing accompanying charge and discharge and that a carbonaceous electroconductive material is added for improving the charge acceptance. Further, Patent Literature 5 discloses to improve the discharge characteristic under PSOC by adding an electroconductive carbon and an activated carbon to the negative electrode active material.

Further, Patent Literature 6 discloses to increase the capacity by increasing the specific surface area of a positive electrode active material from 4.5 $m^2/g$ in the existence case to 6 $m^2/g$ at the greatest. This intends to make the positive electrode active material finer thereby increasing the specific surface area by adding the lignin in an electrolyte during formation of the positive electrode plate. However, according to an experiment, the method of the Patent Literature 6 involves a problem that softening of the positive electrode active material tends to proceed and involves a subject in the cycle life. Further, what is disclosed by the Patent Literature 6 is an invention of increasing the capacity of a battery and no remarkable effect can be obtained for the improvement of the charge acceptability and the cycle characteristic under PSOC necessary for the valve-regulated lead-acid battery for ISS vehicles or generation control vehicles.

CITATION LIST

Patent Literatures

Patent Literature 1: JP-A-2003-36882
Patent Literature 2: JP-A-07-201331
Patent Literature 3: JP-A-11-250913
Patent Literature 4: JP-A-2006-196191
Patent Literature 5: JP-A-2003-051306
Patent Literature 6: JP-A-10-40907

SUMMARY OF INVENTION

Technical Problem

However, since the capacity is ensured while decreasing the amount of an electrolyte and eliminating free electrolyte in the valve-regulated lead-acid battery, it has a feature in that the specific gravity of the electrolyte is higher (1.30 or more) compared with the specific gravity of the flooded lead-acid battery of 1.28 (converted as at 20° C. here and hereinafter). As a result, there has been a technical subject that it is difficult to further improve the charge acceptance.

Further, as described above, proposals have been made taking notice exclusively on the improvement of the performance of the negative electrode active material in the valve-regulated lead-acid batteries. However, there is a limit for improving the charge acceptance and the life performance under PSOC of the valve-regulated lead-acid battery by merely improving the charge acceptance of the negative electrode active material and enhancing the life performance, and it is difficult to further improve the performance of the valve-regulated lead-acid battery used under PSOC.

An object of the present invention is to further improve the charge acceptance and the life performance under PSOC than usual, in lead-acid batteries, particularly, valve-regulated lead-acid batteries in which charging is performed intermittently on every short time and a high rate discharging to a load is performed in a partial state of charge.

Solution to Problem

The present invention is directed to a valve-regulated lead-acid battery in which a group of electrode plates formed by stacking negative electrode plates each having a negative electrode active material filled to a negative electrode collector and positive electrode plates each having a positive electrode active material filled to a positive electrode collector by way of separators is contained together with an electrolyte in a battery container and charging is performed intermittently and high rate discharging to a load is performed in a partial state of charge.

In an aspect of the present invention, at least a carbonaceous electroconductive material and an organic compound having an effect of suppressing growing of the negative electrode active material accompanying repetitive charge and discharge (hereinafter referred to as "organic compound for suppressing growing of a negative electrode active material") are added to the negative electrode active material. Further, a positive electrode plate having a specific surface area of an active material set to a range of 5.5 $m^2/g$ or more is used. Further, an electrolyte having a specific gravity set to a range of 1.30 or more and 1.35 or less is used.

The present inventors have found that when the specific surface area of the active material of the positive electrode active material is increased, the reaction overvoltage in the charge reaction of the positive electrode active material can be lowered to facilitate the progress of the charge reaction thereby improving the charge acceptance of the positive electrode active material, as well as that when the positive electrode plate thus improved for the charge acceptance is used together with a negative electrode plate improved for the life performance by adding at least a carbonaceous electroconductive material and an organic compound for suppressing growing of the negative electrode active material to the negative electrode active material (hereinafter referred to as "negative electrode plate improved for the performance"), the charge acceptance of the entire valve-regulated lead-acid battery can be further improved than that of the existent valve-regulated lead-acid battery and the life performance used under PSOC can be improved further.

When the specific surface area of the active material of the positive electrode active material is less than 5.5 $m^2/g$, no remarkable effect for improving the charge acceptance of the entire valve-regulated lead-acid battery can be obtained, whereas when the specific surface area of the active material of the positive electrode active material is 5.5 $m^2/g$ or more, an effect of improving the charge acceptance of the entire valve-regulated lead-acid battery can be obtained remarkably.

When the charge acceptance of the entire valve-regulated lead-acid battery can be improved, since high rate discharging to a load under PSOC cab be performed with no troubles and this can suppress growing of lead sulfate as a discharging product by repetitive charge and discharge in an insufficiently charged state, the life performance of a battery used under PSOC can be improved.

However, for enabling to obtain the effect described above in the valve-regulated lead-acid battery, it is necessary that the specific gravity of sulfuric acid as an electrolyte is 1.35 or less as will be described later.

When the active material specific surface area of the positive electrode active material is made excessively higher, since the positive electrode active material becomes excessively fine and the structure of the active material is collapsed by repetitive charge and discharge thereby causing a phenomenon referred to as softening, the life of the positive electrode plate is shortened and a lead-acid battery endurable for practical use cannot be obtained. Accordingly, it is not always appropriate to indiscreetly increase the specific area of active material regarding the discharge reaction of the positive electrode active material. According to an experiment, the charge acceptance and the life performance of a battery can be improved when the specific surface area of the active material of the positive electrode active material is 5.5 $m^2/g$ or more. Considering that the positive electrode active material may possibly be softened when the specific surface area of the active material of the positive electrode active material is excessively high, it is preferred to avoid that the active material specific surface area of the positive electrode active material exceeds 13 $m^2/g$. Accordingly, the upper limit for specific surface area of the active material of the positive electrode active material regarding the discharge reaction is preferably 13 $m^2/g$.

On the other hand, for the charge acceptance of the valve-regulated lead-acid battery, the dissolution rate of lead sulfate to an electrolyte is a rate determining step in view of the principle of the charge reaction. That is, since the solubility of lead sulfate to the electrolyte decreases along with increase of the specific gravity of sulfuric acid as the electrolyte, the charge acceptability is lowered. Therefore, according to the experiment, in the valve-regulated lead-acid battery using the positive and negative electrode plates of the invention, charge acceptance higher than that of the existent product (specific gravity: 1.30) can be obtained no more when the specific gravity exceeds 1.35. Accordingly, in order to obtain higher charge acceptance than that of the existent product (specific gravity: 1.30), the specific gravity is defined as 1.35 or less.

That is, when a valve-regulated lead-acid battery in which the specific gravity of the electrolyte is set to 1.30 or more and 1.35 or less is assembled by using a negative electrode plate improved for the performance by adding at least a carbonaceous electroconductive material and an organic compound of suppressing growing of the negative electrode active material accompanying charge and discharge to the negative electrode active material, and a positive electrode plate where the specific surface area of the active material of the positive electrode active material regarding the discharge reaction is set to a range of 5.5 m²/g or more and, preferably, 13 m²/g or less, it is possible to obtain a valve-regulated lead-acid battery in which a high rate discharging to a load used under PSOC is enabled by further improving the charge acceptance than the existent valve-regulated lead-acid battery improved for the charge acceptance exclusively by the improvement of the negative electrode performance and the life performance when used under PSOC is improved by suppressing growing of lead sulfate as a discharging product by repetitive charge and discharge in an insufficiently charged state.

In an aspect of the present invention, the carbonaceous electroconductive material added to the negative electrode active material for improving the charge acceptance of the negative electrode active material is a carbonaceous electroconductive material which may be at least one member selected from the group of carbonaceous electroconductive materials containing one of graphite, carbon black, activated carbon, carbon fiber, and carbon nanotube known so far. The carbonaceous electroconductive material is, preferably, graphite and, more preferably, flake graphite. The particle diameter of the flake graphite is preferably 100 μm or more.

The flake graphite means those specified in JIS M 8601 (2005). The electric resistivity of the flake graphite is 0.02 Ω·cm or lower which is smaller by about one digit than that of a carbon black such as acetylene black which is about 0.1 Ω·cm. Accordingly, by using the flake graphite in stead of carbon blacks used so far in existent lead-acid batteries, the electric resistance of the negative electrode active material can be lowered to improve the charge acceptance.

The average primary particle diameter of the flake graphite is determined according to a laser diffraction
  scattering method specified in JIS M 8511 (2005).
  Measurement is performed by using a laser diffraction
   scattering particle size distribution analyzer (MICROTRACK 9220 FRA, manufactured by Nikkiso Co., Ltd.), charging a flake graphite specimen by an appropriate amount in an aqueous solution containing 0.5 vol % of a commercial surfactant, polyoxyethylene octylphenyl ether (for example, Triton X-100, Roche Diagnostics GmbH) as a dispersant, and after irradiating ultrasonic waves at 40 W for 180 sec while stirring. The obtained value of the average particle diameter (median diameter: D50) is defined as an average primary particle diameter.

The charge reaction of the negative electrode active material depends on the concentration of lead ions dissolved from lead sulfate as the discharging product and the charge acceptance becomes higher as the amount of lead ions is greater. The carbonaceous electroconductive material added to the negative electrode active material has an effect of finely dispersing lead sulfate formed to the negative electrode active material during discharging. When a charge and discharge cycle is repeated in an insufficiently charged state, this results in growing of lead sulfate as the discharging product and the concentration of lead ions dissolved from lead sulfate is lowered to lower the charge acceptance. However, when the carbonaceous electroconductive material is added to the negative electrode active material, since the lead sulfate can be maintained in a fine state while suppressing growing of lead sulfate and lead ions dissolved from lead sulfate can be maintained in a state of high concentration, the charge acceptance of the negative electrode can be maintained high for a long time.

As the organic compound added to the negative electrode active material for suppressing growing of the negative electrode active material accompanying charge and discharge, it is preferred to use those containing a formaldehyde condensate of bisphenols aminobenzene sulfonic acid as the main ingredient.

In this case, it was experimentally confirmed that a preferred result can be obtained by using a formaldehyde condensate of bisphenol A aminobenzene sulfonic acid represented by the following chemical structural formula of Chem. 1 as the formaldehyde condensate of bisphenols aminobenzene sulfonic acid.

[Chem. 1]

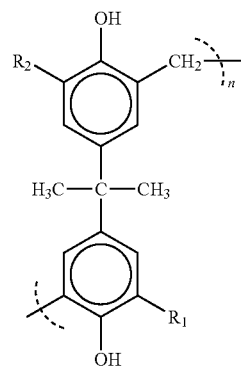

$R_1$, $R_2$ represent each hydrogen or

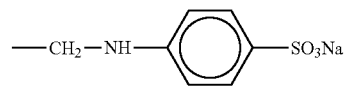

(excluding a case where both $R_1$ and $R_2$ are hydrogen)

Since the formaldehyde condensate of bisphenols aminobenzene sulfonic acid have an effect of suppressing growing of the negative electrode active material in the same manner as the lignin and, in addition, they have no portions which are tended to be oxidized or reduced during charge and discharge of the valve-regulated read-acid battery, when the condensate is added to the negative electrode active material, the effect of suppressing growing of the negative electrode active material by charge and discharge can be maintained. Further, since the lignin is adsorbed to lead ions dissolving from lead sulfate during charging to lower the reactivity of the lead ions, it has a side effect of hindering the charge reaction of the negative electrode active material and suppressing the improvement of the charge acceptance. However, since the condensate described above is adsorbed in a less amount to the lead ions, it shows less side effect that hinders the charge reaction compared with the lignin. Accordingly, when the formaldehyde condensate of bisphenols aminobenzene sulfonic acid are added together with the carbonaceous electroconductive material to the negative electrode active material, they can maintain the improved charge acceptance of the negative electrode active material and suppressing the lowering of the reactivity during charge and discharge by repetitive charge and discharge, thereby capable of improving the charge acceptance of the negative electrode plate and the life performance.

On the other hand, according to the experiment performed by the present inventors, the negative electrode plate with addition of the formaldehyde condensate of bisphenols aminobenzene sulfonic acid involves a problem that the hydrogen overvoltage is lowered. Accordingly, in a valve-regulated lead-acid battery used for usual vehicle starting but not for PSOC, the electrolyte decrease during charging is increased to shorten the life and cannot be used since the amount of the electrolyte is originally limited. Such a problem does not occur when used under PSOC as in the present invention since the battery is not charged to a hydrogen generation potential. That is, the present invention is restricted to a valve-regulated read-acid battery in which charging is performed intermittently and high rate discharging to a load is performed under PSOC as defined in claims.

The present invention discloses that the effect of remarkably improving the charge acceptance and the life performance when used under PSOC of the valve-regulated lead-acid battery can be obtained by using a positive electrode plate in which the specific surface area of the active material regarding the discharge reaction of the positive electrode active material is set to an appropriate range in combination with a negative electrode plate improved for the performance (charge acceptance and life performance), and setting the specific gravity of the electrolyte in an appropriate range. As the negative electrode plate, it is preferred to use those having the charge acceptance and the life performance as high as possible. In an aspect of the present invention, the amount of the carbonaceous electroconductive material added to the negative electrode active material for improving the charge acceptance of the negative electrode plate and the amount of the organic compound added to the negative electrode active material for suppressing growing of the negative electrode active material by charge and discharge are not particularly restricted, but it will be apparent that the addition amount of the additive is determined so as to improve the performance of the negative electrode plate as much as possible upon practicing the invention.

Advantageous Effects of Invention

According to an aspect of the invention, the charge acceptance of the entire valve-regulated lead-acid battery can be improved further than the existent valve-regulated lead-acid battery in which the charge acceptance is improved by exclusively improving the negative electrode plate, by combining the positive electrode plate improved for the charge acceptance by defining the specific surface area of the active material of the positive electrode active material regarding the discharge reaction as 5.5 $m^2/g$ or more and, preferably, 13 $m^2/g$ or less and a negative electrode plate in which the charge acceptance and the life performance are improved by the addition of the carbonaceous electroconductive material and the organic compound for suppressing growing of the negative electrode active material, to the negative electrode active material and using the electrolyte while setting the specific gravity thereof to 1.30 or more and 1.35 or less. Accordingly, not only the high rate discharging to a load under PSOC is enabled but also the life performance when used under PSOC can be improved by suppressing growing of lead sulfate by repetitive charge and discharge under the insufficiently charged state.

Particularly, in an aspect of the present invention, when a compound containing the formaldehyde condensate of bisphenols aminobenzene sulfonic acid as the main ingredient which is lowered for the side effect of hindering the charge reaction is used as the organic compound to be added to the negative electrode active material for suppressing growing of the negative electrode active material accompanying the charge and discharge, the charge acceptance and the life performance of the valve-regulated lead-acid battery can be improved greatly.

DESCRIPTION OF EMBODIMENT

The valve-regulated lead-acid battery according to the invention is a valve-regulated lead-acid battery in which charging is performed intermittently and high rate discharging to a load is performed under PSOC, which is suitable to be used in micro hybrid vehicles, etc. such as ISS vehicles. In the valve-regulated lead-acid battery according to the invention, an electrode plate group formed by stacking negative electrode plates each having a negative electrode active material filled to a negative electrode collector and positive electrode plate each having a positive electrode active material filled to a positive electrode collector by way of retainers is contained together with an electrolyte in a battery container. The basic configurations described above are identical with those of existent valve-regulated lead-acid batteries.

In valve-regulated lead-acid batteries, efforts have been made so far exclusively for improving the charge acceptance of the negative electrode in order to improve the charge acceptance, whereas according to the invention, it is further intended to improve the charge acceptance of the valve-regulated lead-acid battery while improving the charge acceptance not only for the negative electrode but also for the positive electrode by using the negative electrode plate improved for the charge acceptance and the positive electrode plate improved for the charge acceptance in combination, thereby further improving the charge acceptance of the valve-regulated lead-acid battery and suppressing growing of lead sulfate by repetitive charge and discharge in an insufficiently charged state intending to further improve the life performance. Prior to explanation for the examples of the invention, basic technical idea of the invention is to be described.

As a result of analysis for the relation between the change of potential on the positive electrode plate and the charge current during charging and a relation between the change of potential on the negative electrode plate and the charge current during charging, the inventors have found that the charge acceptance of the entire valve-regulated lead-acid battery can be improved further than the existent valve-regulated lead-acid battery in which only the charge acceptance of the negative electrode plate was improved, when the charge acceptance of a positive electrode plate is improved in a case of using the negative electrode plate improved for the charge acceptance by lowering the reaction overvoltage. When the charge acceptance can be improved, not only the high rate discharging to a load under PSOC can be performed with no troubles but also growing of lead sulfate by repetitive charge and discharge in an insufficiently charged state can be suppressed to improve the life performance.

Figure 1:
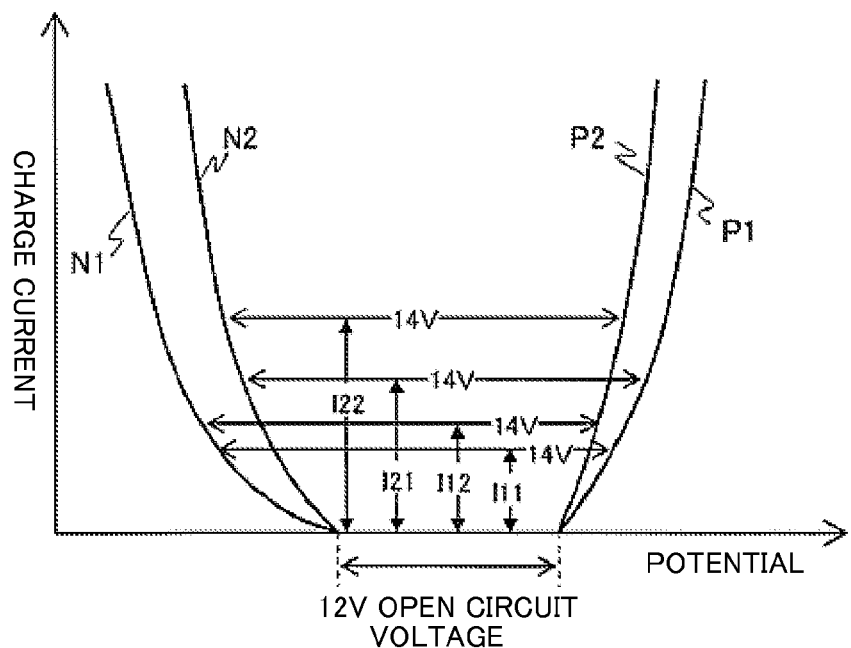
[FIG. 1] is a graph showing a relation between a charge current and a potential on negative electrode plate and a positive electrode plate when charging a valve-regulated lead-acid battery used for automobiles at an open circuit voltage of 12 V while keeping a charge voltage at 14 V (constant).

FIG. 1 shows a relation between a charge current and a potential on a negative electrode plate and a positive electrode plate when a valve-regulated lead-acid battery for vehicles at an open circuit voltage of 12 V is charged at a charge voltage of 14 V (constant). In FIG. 1, the ordinate expresses the charge current and the abscissa expresses the potential on the positive electrode plate and the negative electrode plate measured with reference to the standard hydrogen electrode (vs SHE). In the graph, N1 and N2 show charge current vs potential curves of a negative electrode plate and P1 and P2 show charge current vs potential curves of a positive electrode plate. While the charge current vs potential curve for the negative electrode plate should be illustrated in the third quadrant of the orthogonal ordinate system, the charge current vs potential curve for the negative electrode plate is shown together with the charge current vs potential curves for the positive electrode plate while reversing the polarity of the potential and the current in the first quadrant in FIG. 1 for the convenience of explanation.

In FIG. 1, N1 shows a charge current vs potential curve in which the overvoltage in the charge reaction taken place on the negative electrode plate is higher compared with that of N2. When the overvoltage in the charge reaction is higher, the charge current vs potential curve for the negative electrode plate is in the form extending greatly outward as shown at N1, whereas when the overvoltage is lower, it draws a curve which is more abrupt than N1 as shown at N2.

Further, P1 shows a charge current vs potential curve when the overvoltage in the charge reaction taken place on the negative electrode plate is higher compared with that of P2. When the overvoltage is higher, the charge current vs potential curve P1 is in the form extending greatly outward as shown at P2, whereas when the overvoltage is lower, it draws a curve which is more abrupt than P1.

Overvoltage η in the charge reaction is a variation of the potential generated in each of the electrodes upon application of a charge voltage in a state of an open circuit and the overvoltage η is represented by an absolute value for the difference between the potential of each of the electrodes upon application of the charge voltage and an equilibrium potential (open circuit voltage), that is, η=|electrode potential upon application of charge voltage−equilibrium potential|.

While the charge current vs potential curve for the negative electrode plate not particularly devised for the improvement of the charge acceptance of the negative electrode active material is in the form extending outward as shown at N1 in FIG. 1, the charge current vs potential curve of the negative electrode plate improved for the charge acceptance by addition of an appropriate amount of the carbonaceous electro-conductive material and the organic compound for suppressing growing of the negative electrode active material which is caused accompanying charge and discharge is in an abrupt form as shown at N2.

The charge current vs potential curve for the positive electrode plate not particularly devised for the improvement of the charge acceptance of the positive electrode active material is in the form as shown at P1 in FIG. 1. P1 is a charge current vs potential curve of the positive electrode plate used in an existent valve-regulated lead-acid battery which draws a more abrupt curve compared with N1. This means that the charge acceptance in the negative electrode plate is low and the charge acceptance in the positive electrode is high by nature in the valve-regulated lead-acid battery. When the overvoltage in the charge reaction of the positive electrode active material is lowered to improve the charge acceptance of the positive electrode plate, the charge current vs potential curve of the positive electrode plate is in the form which is more abrupt than P1 as shown at P2 in FIG. 1.

Assuming that a valve-regulated lead-acid battery is assembled by using a negative electrode plate and a positive electrode plate with charge current vs potential characteristic curves being N1 and P1 respectively, a charge current flowing upon application of a charge voltage at 14 V from the state of an open circuit voltage (12 V) is I11. The open circuit voltage is a difference between the positive electrode potential and the negative electrode potential and 14 V to be applied is also a difference between the potentials on both electrodes.

Then, assuming that a valve-regulated lead-acid battery is assembled by combining a negative electrode plate improved for the charge acceptance by lowering the overvoltage in the charge reaction such that the charge current vs potential characteristic curve is N2 and a positive electrode plate with the charge current vs potential curve is P1, the charge current flowing upon application of the charge voltage at 14 V is I21 (>I11). In view of the above, it can be seen that the charge current can be increased greatly even when the charge current vs potential curve for the positive electrode plate remains at P1 as it is (with no particular improvement for the performance of the positive electrode plate). That is, when the charge acceptance of the negative electrode active material is improved such that the charge current vs potential characteristic curve is N2, the charge acceptance for the entire valve-regulated lead-acid battery can be improved greatly with no particular improvement for the charge acceptance of the positive electrode plate.

Then, assuming that a valve-regulated lead-acid battery is assembled by combining a positive electrode plate in which the reaction overvoltage is lowered such that the charge current vs potential curve is P2 and a negative electrode plate with the charge current vs potential curve being N1, the charge current flowing upon application of the charge voltage at 14 V is I12 (>I11), and the charge acceptance can be improved more compared with a case of using the positive electrode plate with the charge current vs potential curve being P1 and a negative electrode plate with the charge current vs potential curve being N1. However, the charge acceptance cannot be improved so much as in the case of combining the positive electrode plate with the charge current vs potential curve being P1 and the negative electrode plate with the charge current vs potential curve being N2.

whereas, when a valve-regulated lead-acid battery is assembled by combining a negative electrode plate in which an overvoltage is lowered such that the charge current vs potential curve is N2 (improved for charge acceptance) and a positive electrode plate in which the overvoltage is lowered such that the charge current vs potential curve is P2 (improved for charge acceptance), the charge current flowing upon application of the charge voltage at 14 V can be increased to I22 (>I11), and the charge acceptance of the entire valve-regulated lead-acid battery can be improved greatly compared with the case of improving only the charge acceptance of the negative electrode plate.

The present inventors have taken notice on that when the charge acceptance of the positive electrode plate can be improved, the charge acceptance of the entire valve-regulated lead-acid battery can be improved greatly than the existent valve-regulated lead-acid battery where only the charge acceptance of the negative electrode plate is improved by using the positive electrode plate in combination with the negative electrode plate improved for the charge acceptance as described above.

Then, as a result of performing various studies for means to be taken for improving the charge acceptance of the positive electrode plate and performing experiments, it has been found that the charge acceptance of the positive electrode plate can be improved such that the charge current vs potential curve forms an abrupt curve at P2 in FIG. 1 by increasing the specific surface area of the active material of the positive electrode active material. Then, it has been found that the charge acceptance of the entire battery can be improved further and the life performance when used under PSOC can be improved further than the existent valve-regulated lead-acid battery in which the charge acceptance of the entire battery was improved by improving only the charge acceptance of the negative electrode plate, by assembling a valve-regulated lead-acid battery by combining a positive electrode plate in which the charge acceptance is improved by setting the specific surface area of the active material of the positive electrode active material to a range of 5.5 m²/g or more with a negative electrode plate in which a carbonaceous electroconductive material and an organic compound having an effect of suppressing growing of a negative electrode active material which is caused accompanying charge and discharge are added to the negative electrode active material and setting the specific gravity of the electrolyte to 1.30 or more and 1.35 or less.

In the present specification, the specific surface area of the active material of the positive electrode active material is defined as described below. That is, this is measured by a nitrogen gas adsorption method. This is a method of adsorbing an inert gas in which the size of one molecule is known to the surface of a specimen to be measured and determining the surface area based on the adsorption amount and the occupying area of the inert gas, which is a general method for measuring the specific surface area. Specifically, it is measured based on the following BET formula.

The relation of the formula (1) is well established in a range of P/Po of 0.05 to 0.35. The formula (1) is modified (dividing numerator and denominator with P on the left side) to obtain the formula (2).

In a specific surface area meter used for measurement, gas molecules of known adsorption occupying area are adsorbed to a specimen and a relation between the adsorption amount (V) and the relative pressure (P/Po) is measured. Based on the measured V and P/Po, the left side in the formula (2) and P/Po are plotted. Assuming the slope as s, a formula (3) is derived from the formula (2).

Assuming an intercept as i, the intercept i and the slope s are as shown respectively in the formula (4) and formula (5). The formula (4) and the formula (5) are modified into formula (6) and a formula (7) respectively to obtain a formula (8) for determining a single molecular layer adsorption amount Vm.

That is, when the single molecular layer adsorption amount V at a certain relative pressure P/Po is measured at several points and the slope of the plots and the intercept are determined, the single molecular layer absorption amount Vm is determined. The total surface area of the specimen Stotal is determined according to the formula (9), while the specific surface area S is determined based on the total surface area Stotal according to the formula (10).

[Equation 1]

$$\frac{P}{V(P_0 - P)} = \left(\frac{C-1}{V_m C}\right)\left(\frac{P}{P_0}\right) + \frac{1}{V_m C} \qquad \text{Formula (1)}$$

P: Absorption equilibrium pressure in an absorption equilibrium state at a constant temperature.

Po: Saturated vapor pressure at an adsorption temperature.

V: Adsorption amount at an adsorption equilibrium pressure P

Vm: Single molecular layer adsorption amount (adsorption amount when gas molecules form a single molecular layer on a solid surface).

C: BET constant (parameter concerning interaction between a solid surface and an adsorbed substance).

[Equation 2]

$$\frac{1}{V\left(\frac{P_0}{P} - 1\right)} = \left(\frac{C-1}{V_m C}\right)\left(\frac{P}{P_0}\right) + \frac{1}{V_m C} \qquad \text{Formula (2)}$$

[Equation 3]

$$s = \frac{C-1}{V_m C} = \frac{C}{V_m C} - \frac{1}{V_m C} = \frac{1}{V_m} - \frac{1}{V_m C} \qquad \text{Formula (3)}$$

[Equation 4]

$$i = \frac{1}{V_m C} \qquad \text{Formula (4)}$$

[Equation 5]

$$s = \frac{1}{V_m} - i \qquad \text{Formula (5)}$$

[Equation 6]

$$s \times V_m = 1 - i \times V_m \qquad \text{Formula (6)}$$

[Equation 7]

$$(s + i)V_m = 1 \qquad \text{Formula (7)}$$

[Equation 8]

$$V_m = \frac{1}{s + i} \qquad \text{Formula (8)}$$

[Equation 9]

$$S_{total} = (V_m \times N \times A_{CS})M \qquad \text{Formula (9)}$$

$S_{total}$ Entire surface area (m²)
Vm: Single molecular layer adsorption amount (–)
N: Avogadro number (–)
$A_{cs}$: Adsorption cross sectional area (m²)
M: Molecular weight (–)

[Equation 10]

$$S = \frac{S_{total}}{W} \quad \text{Formula (10)}$$

S: Specific surface area (m²/g)
W: Amount of sample (g)

A high specific surface area of the active material of the positive electrode active material means that the discharge reaction can be continued over a long time while maintaining a state in which diffusing movement of hydrogen ions ($H^+$) and sulfate ions ($SO_4^{2-}$) as reaction species in the discharge reaction over a long time. Keeping the diffusion of the reaction species over the long time means that many diffusion paths for reaction species are present.

On the other hand, in the charge reaction, diffusion paths for hydrogen ions and sulfate ions which are formed accompanying the progress of the charge reaction are necessary. It is considered that when the specific surface area of the positive electrode active material is kept high, many diffusion paths can exist for hydrogen ions and sulfate ions generated upon taking place the charge reaction and the products can be diffused rapidly without accumulating the products on the reaction surface of the electrode plate thereby taking place the charge reaction smoothly over the entire electrode plate to facilitate the progress of the charge reaction and improve the charge acceptance of the positive electrode plate.

Naturally, the improving mechanism described above is established within a range of the specific gravity of 1.35 or less in which the charge reaction is not restricted by the dissolution rate of lead sulfate.

In an aspect of the present invention, for improving the performance of the negative electrode plate, at least a carbonaceous electroconductive material and an organic compound for suppressing growing of the negative electrode active material accompanying charge and discharge are added to the negative electrode active material.

The carbonaceous electroconductive material is preferably selected from the group of materials containing graphite, carbon black, activated carbon, carbon fiber, and carbon nanotube. The addition amount of the carbonaceous electroconductive material is preferably within a range from 0.1 to 3 mass parts based on 100 mass parts of the negative electrode active material in a fully charged state (spongy lead). Preferably, graphite is selected and, more preferably, flake graphite is selected. The average particle diameter of the flake graphite is preferably 100 μm or more.

Valve-regulated lead-acid batteries mounted on micro-hybrid vehicles such as ISS vehicles or generation control vehicles are used under PSOC. In the valve-regulated lead-acid battery used under such a situation, a phenomenon referred to as sulfation occurs in an early stage. The sulfation means that lead sulfate as an insulator formed in the negative electrode active material during discharging is grown accompanying repetitive charge and discharge. When the sulfation occurs, the charge acceptance and the discharge performance of the negative electrode active material are deteriorated remarkably.

The carbonaceous electroconductive material added to the negative electrode active material has an effect of suppressing growing of lead sulfate, maintaining lead sulfate in a fine state, and suppressing the lowering of the concentration of lead ions dissolving from lead sulfate, thereby maintaining the state where the charge acceptance is high.

Further, when an organic compound for suppressing growing of the negative electrode active material accompanying charge and discharge is added to the negative electrode active material, a negative electrode plate in which the reactivity in charge and discharge is not deteriorated for a long time and the state of high charge acceptance can be maintained for a long time can be obtained by optimizing the addition amount thereof.

While the charge acceptance of the entire battery can be improved by merely adding the carbonaceous electroconductive material and the organic compound for suppressing growing of the negative electrode active material to the negative electrode active material, the charge acceptance of the entire battery can be improved further by combining the negative electrode plate with the positive electrode plate described above.

As the organic compound for suppressing growing of the negative electrode active material, formaldehyde condensates of bisphenols aminobenzene sulfonic acid are preferably used. The bisphenols include, for example, bisphenol A, bisphenol F, bisphenol S, etc. Among the condensates, a formaldehyde condensate of bisphenol A aminobenzene sulfonic acid as shown below by the chemical structural formula of [Chem. 2] is particularly preferred. In this case, it is further preferred to define the specific surface area of the positive electrode active material as 9.4 m²/g or more and 13 m²/g or less.

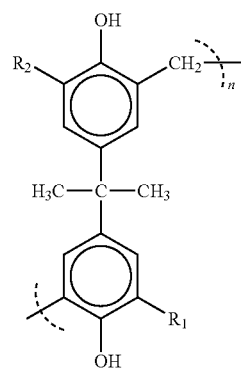

[Chem. 2]

$R_1$, $R_2$ represent each hydrogen or

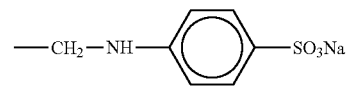

(excluding a case where both $R_1$ and $R_2$ are hydrogen)

As described above, the charge reaction of the negative electrode active material depends on the concentration of lead ions dissolved from lead sulfate as the discharging product and the charge acceptance is higher as the lead ions are present more. Since the lignin used generally as an organic compound added to the negative electrode active material for suppressing growing of the negative electrode active material accompanying charge and discharge has a side effect of inhibiting the charge reaction of the negative electrode active material thereby suppressing the improvement of the charge acceptance since the lignin is adsorbed to lead ions to lower the reactivity of the lead ions. On the contrary, since the formaldehyde condensate of bisphenols aminobenzene sulfonic acid includes those represented by the chemical structural formula of "Chem. 2" shows less adsorbability to the lead ions and less adsorption amount, when the condensate is used instead of the lignin, it less hinders the charge acceptance and less hinders the maintenance of the charge acceptance by the addition of the carbonaceous electroconductive material.

In an aspect of the present invention, selection of sodium lignin sulfonate represented by the chemical structural formula (partial structure) of [Chem. 3] is not excluded as the organic compound for suppressing growing of the negative electrode active material accompanying charge and discharge. While sodium lignin sulfonate is used frequently as the organic compound for suppressing growing of the negative electrode active material, it involves a drawback that adsorption to the lead ions is storing and the side effect of suppressing charge reaction is strong. On the contrary, since the formaldehyde condensate of bisphenols aminobenzene sulfonic acid have less adsorption to the lead ions and is less adsorbed to the lead ions in view of the amount, it scarcely hinders the charge reaction and do not hinder the charge acceptance.

[Chem. 3]

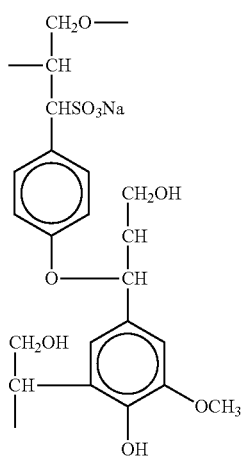

EXAMPLE

In Japan, flooded type lead-acid batteries are used generally for vehicles but valve-regulated lead-acid batteries are not specified in JIS standards for engine starter battery (JIS D 5301). Accordingly, in this example, 12 V valve-regulated lead-acid batteries were manufactured by using battery containers of B20 size specified in JIS standards for the flooded type as an example but the present invention is not restricted to the standards (constitution) of battery. That is, the intended object of the invention can be attained by valve-regulated lead-acid batteries of any of standards (constitution) by replacing the existent positive and negative electrode active materials and the range of the specific gravity of the electrolyte with those of the invention.

At first, unformed positive electrode plates were manufactured. Water was added to and kneaded with a mixture of lead-oxide, red lead, and cut fibers (polyethylene terephthalate short fibers here and hereinafter) and, successively, they were kneaded with addition of a diluted sulfuric acid little by little to prepare an active material paste for positive electrode. The active material paste was filled in an expanded collector fabricated by applying expanding fabrication to a rolled sheet consisting of a lead alloy, aged in an atmosphere at 40° C. and 95% humidity for 24 hours, and then dried to prepare an unformed positive electrode plate.

Positive electrode plates having positive electrode active materials of various different specific surface areas regarding the discharge reaction were prepared by changing the conditions for the formation in battery container to be described later.

Then, unformed electrode plates were manufactured. Water was added to and kneaded with a mixture of lead oxide, cut fibers, barium sulfate, a carbonaceous electroconductive material, and an organic compound for suppressing growing of a negative electrode active material and then successively they were kneaded while adding a diluted sulfuric acid little by little to prepare an active material paste for negative electrode. The active material paste was filled in an expanded collector fabricated by applying expanding fabrication to a rolled sheet consisting of lead alloy, aged in an atmosphere at 40° C. and 95% humidity for 24 hours, and then dried to manufacture an unformed negative electrode plate. Then, negative electrode plates A, B, C, and B' shown below were prepared while changing the organic compound for suppressing the glowing of the negative electrode active material and the carbonaceous electroconductive material.

Negative Electrode Plate A:
Prepared by selecting a compound containing sodium lignin sulfonate represented by "Chem. 3" described above as a main ingredient for the organic compound for suppressing growing of the negative electrode active material, using a carbon black as the carbonaceous electroconductive material obtained from heavy oil as a starting material (specific surface area: 260 $m^2/g$), and defining the addition amount thereof to 0.2 mass parts based on 100 mass parts of the active material. 100 mass parts of the active material mean 100 mass parts of the active material in a fully charged state (spongy lead). This is identical here and hereinafter.

Negative Electrode Plate B:
Prepared by selecting a compound containing a formaldehyde condensate of bisphenol A aminobenzene sulfonic acid represented by [Chem. 2] described above as a main ingredient (molecular weight: 17,000 to 20,000, sulfur content in the compound: 6 to 11 mass %) for the organic compound for suppressing growing of the negative electrode active material, using the carbon black described above for the carbonaceous electroconductive material, and defining the addition amount as 0.2 mass parts based on 100 mass parts of the active material.

Negative Electrode Plate C:
Prepared by selecting a compound comprising a formaldehyde condensate of bisphenol A aminobenzene sulfonic acid represented by [Chem. 2] described above (molecular weight: 17,000 to 20,000, sulfur content in the compound: 6 to 11 mass %) as a main ingredient for the organic compound for suppressing growing of the negative electrode active material, using a natural flake graphite (particle diameter: 180 μm) for the carbonaceous electroconductive material, and defining the addition amount as 2 mass parts based on 100 mass parts of the active material.

Negative Electrode Plate B':
Prepared by selecting a compound containing a formaldehyde condensate of bisphenol A aminobenzene sulfonic acid represented by (Chem. 2) described above as a main ingredient (molecular weight 17,000 to 20,000, sulfur content in the compound: 6 to 11 mass %) for the main ingredient as the organic compound for suppressing growing of the negative electrode active material with no addition of the carbonaceous electroconductive material.

Then, the positive electrode plate and the negative electrode plates A, B, C, and B' were combined with retainers used generally for valve-regulated lead-acid batteries to assemble valve-regulated lead-acid batteries not having free liquid. In the assembling of the batteries, the positive electrode plates and the negative electrode plates were alternately stacked by way of retainers to constitute a electrode plate group containing five sheets of positive electrode plates and six sheets of negative electrode plates, and the electrode plate lugs of an identical polarity were welded to each other by a cast-on strap (COS) method to prepare an electrode plate group.

Then, formation was performed in battery container. A diluted sulfuric acid was poured into a battery container, and charging was performed by supplying an electric quantity of 200% to the theoretical capacity based on the amount of active material to complete a valve-regulated lead-acid battery. The positive electrode active material changes the characteristic of the active material depending on the temperature, the current density, and the specific gravity of the electrolyte during formation. The specific surface area of the positive electrode active material can be decreased by increasing the formation temperature and increased by increasing the specific gravity of the electrolyte. Then, various kinds of lead-acid batteries having different specific surface areas of the active material of the positive electrode plate were prepared by adjusting the temperature and the specific gravity of the electrolyte during formation in battery container. The specific surface area of the positive electrode active material can be adjusted, for example, by also properly selecting the starting material of lead powder, the lead powder kneading condition, the electrode plate aging condition, etc. in addition to the formation conditions described above. The intended effect of the invention can be obtained even when means for adjusting the specific surface area of the positive electrode active material is different so long as the specific surface area of the active material is within the range of the invention as a result.

Further, for confirming the effect of the specific gravity of the electrolyte, butteries having electrolytes of different specific gravities were manufactured by adding an appropriate amount of sulfuric acid at a specific gravity of 1.5 to the electrolyte of the valve-regulated lead-acid battery after formation and performing gassing charge. Free excess electrolyte was sucked from a valve cylinder by way of a tube and eliminated from a battery container.

A battery was disassembled after the formation in battery container to take out positive electrode plates, and the specific surface area of the positive electrode active material was measured in accordance with the definition described above.

Presence of the formaldehyde condensate of bisphenol A aminobenzene sulfonic acid represented by (Chem. 2) in the negative electrode active material was confirmed by nuclear magnetic resonance (hereinafter referred to NMR) spectroscopy. Analysis was performed as described below by using an NMR spectroscope (Model: ECA-500FT-NMR) manufactured by JEOL Ltd.

At first, the lead-acid battery of Example 1 after completion of formation was disassembled to take out the negative electrode plates. The taken out negative electrode plates were washed with water to flush away a sulfuric acid component. The negative electrode active material after formation was spongy lead. For preventing oxidation of the negative electrode active material, the negative electrode plate was dried in an inert gas such as nitrogen. A negative electrode active material was separated from the dried negative electrode plate and pulverized. The pulverizate was charged in a 10% sodium hydroxide solution and an extract after removing the resultant precipitate (lead hydroxide) was analyzed and measured by the apparatus described above. The measuring conditions are as shown in Table 1.

TABLE 1

| Measured nuclei species | $^1$H |
|---|---|
| Magnetic field strength | 11.747T (500 MHz at $^1$H nuclei) |
| Measurement range | −3 ppm to −15 ppm |
| Number of data | 16384 point |
| Measuring mode | Non decoupling method |
| Pulse wait time | 7 sec |
| Number of cycles of accumulation | 128 cycles |
| Solvent for measurement | Heavy water |
| Temperature at measurement | Room temperature |

Figure 2:
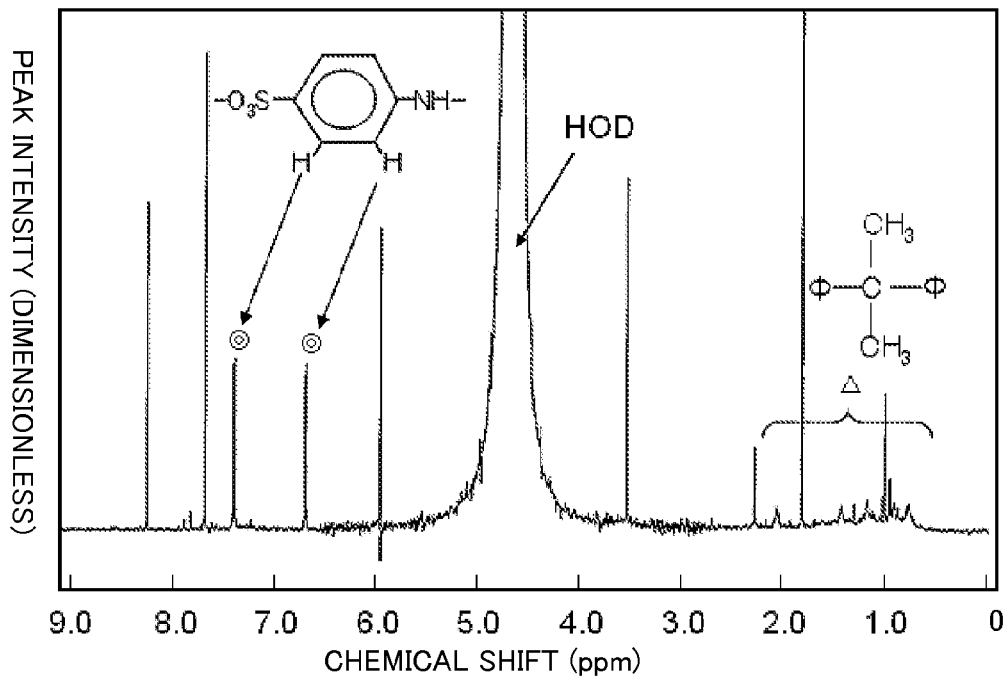
[FIG. 2] shows spectra obtained by extracting (Chem. 2) added to a negative electrode from the negative electrode plate after formation and measuring the same according to NMR spectroscopy.

FIG. 2 shows spectra measured by NMR spectroscopy. The abscissa expresses chemical shift (ppm) and the ordinate expresses peak intensity.

As shown by double circles at 6.7 ppm and 7.5 ppm of the chemical shift, peaks attributable to the p-amino benzene sulfonic acid group in the formaldehyde condensate of bisphenol A aminobenzene sulfonate represented by [Chem. 2] was observed. Further, as shown by trigonal marks in a region of 0.5 ppm to 2.5 ppm of the chemical shift, peaks attributable to the bisphenol A skeleton of the formaldehyde condensate of bisphenol A aminobenzene sulfonic acid represented by [Chem. 2] were observed.

In view of the result described above, presence of the formaldehyde condensate of bisphenols aminobenzene sulfonate represented by [chem. 2] in the negative electrode active material could be confirmed.

The electrode plate group manufactured in this example includes the following five types. In types 1 to 4, the effects of the specific surface area of the positive electrode active material and the additives of the negative electrode active material were compared. In type 5, the effect of the specific gravity of the electrolyte was compared.

In this example, the specific surface area of the positive electrode active material and the specific surface area of the carbon black were measured according to the nitrogen gas adsorption method described above. That is, S determined by [formula 10] described above was defined as the specific surface area of the positive electrode active material and the specific surface area of the carbon black.

Type 1:
Positive electrode plate: The specific surface area of the positive electrode active material was changed for 7 steps from 4.5 m$^2$/g to 14.1 m$^2$/g.

Negative electrode plate: Negative electrode plate B prepared by defining the addition amount of a carbon black with a specific surface area of 260 m$^2$/g obtained from heavy oil as the starting material to 0.2 mass parts based on 100 mass parts of the active material and using the condensate of [Chem. 2] for the organic compound for suppressing growing of the negative electrode active material.

Specific gravity of electrolyte: constant at (1.30).
Type 2:
Positive electrode plate: The specific surface area of the positive electrode active material was changed for 7 steps from 4.5 m$^2$/g to 14.1 m$^2$/g.

Negative electrode plate: Negative electrode plate A prepared by defining the addition amount of a carbon black to 0.2 mass parts based on 100 mass parts of the active material and selecting the sodium lignin sulfonate of [Chem. 3] as a main ingredient for the organic compound for suppressing growing of the negative electrode active material.

Specific gravity of electrolyte: constant at (1.30).

Type 3:

Positive electrode plate: The specific surface area of the positive electrode active material was changed for 7 steps from 4.5 m$^2$/g to 14.1 m$^2$/g.

Negative electrode plate: Negative electrode plate C prepared by defining the addition amount of a natural flake graphite to 2 mass parts based on 100 mass parts of the active material and using the condensate of [Chem. 2] for the organic compound for suppressing growing of the negative electrode active material.

Specific gravity of electrolyte: constant at (1.30).

Type 4:

Positive electrode plate: The specific surface area of the positive electrode active material was changed for 7 steps from 4.5 m$^2$/g to 14.1 m$^2$/g.

Negative electrode plate: Negative electrode plate B' with no addition of a carbon black and using the condensate of [Chem. 2] for the organic compound for suppressing growing of the negative electrode active material.

Specific gravity of electrolyte: constant at (1.30).

Type 5

Positive electrode plate: The specific surface area of the positive electrode active material was defined to 11.0 m$^2$/g.

Negative electrode plate: The negative electrode plate A, B or C described above.

Specific gravity of electrolyte: Changed for six steps of 1.25, 1.30, 1.33, 1.35, 1.40, and 1.46.

For the valve-regulated lead-acid batteries of types 1 to 5, the charge acceptance and the cycle characteristic were measured. At first, the charge acceptance was measured as described below. For the lead-acid batteries in the initially assembled state, SOC (state of charge) was adjusted to 90% of the full charge state in a thermostatic bath at 25° C., and a charge current value at 5 second from the start of the application of a charge voltage at 14 V (providing that the current before reaching 14 V was restricted to 100 A) (5 sec charge current value) was measured. Higher 5 sec charge current value means higher initial charge acceptance. Further, after repeating a cycle test for 5,000 cycles assuming charging at a charge voltage of 14.8 V (providing that current is restricted to 25 A before reaching 14.8 V) for 10 minutes of charging time and discharging of constant current discharge at 25 A for 4 minutes of discharge time as one cycle, the charge acceptance was measured under the same conditions as those in the initial stage. That is, higher 5 sec charge current value after 5,000 cycles means that the good charge acceptance in the initial stage is maintained also thereafter.

The cycle characteristic was measured as described below (life test). After adjusting the atmospheric temperature such that the battery temperature was at 25° C., performing constant current discharging at 45 A for 59 sec, and at 300 A for 1 sec, a life test including constant current—constant voltage charging at 100 A-14 V-60 sec as one cycle was performed. The test is a cycle test simulating the way of using a valve-regulated lead-acid battery in an ISS vehicle. In the life test, since the charging amount is smaller than the discharging amount, it gradually goes to an insufficiently charged state when charging is not performed completely and, as a result, the voltage at 1 sec when discharging was performed at a discharge current of 300 A for 1 sec. That is, when the negative electrode is polarized during constant current—constant voltage charging and, when discharging is switched to the constant voltage charging in an early stage, the charge current is decayed to result in an insufficiently charged state. In the life test, it was judged that the battery was run out when the voltage lowered below 7.2 V at one second during discharging at 300 A.

Unless a higher charge acceptance is maintained also during charge and discharge cycle, an insufficiently charged state continues to worsen the cycle characteristic. When the change of the 5 sec charge current value accompanying charge and discharge cycle and the cycle characteristic are evaluated, it can be appropriately evaluated whether the charge acceptance during the charge and discharge cycle is appropriate or not.

According to the test described above, the charge acceptance and the durability can be evaluated when charging is performed intermittently and high rate discharging to a load is performed under PSOC.

Tables 2 to 5 show the result of measurement for 5 sec charge current and the result of measurement for the cycle characteristic performed to the valve-regulated lead-acid batteries having the configuration of type 1 to 4 electrode plate groups. In Table 2 and Table 3, specific surface area of the positive electrode active material of 4.5 m$^2$/g are for existent examples. In Table 4, specific surface area of the positive electrode active material of 4.5 m$^2$/g is for a reference example. In Table 5 in which the carbonaceous electroconductive material was not added to the negative electrode active material, all of cases for the specific surface area of the positive electrode active material of 4.5 m$^2$/g to 14.1 m$^2$/g are for comparative examples. The 5 sec charge current and the cycle characteristic shown in each of the tables were evaluated with reference to the existent example in Table 3 being assumed as 100 (100 for the initial stage in the 5 sec charge current). In the evaluation column of the tables, those excellent over the existent example in Table 3 as the reference are shown by "○" and those particularly excellent thereover are shown by "◉".

TABLE 2

| No. | Specific surface area of positive electrode active material | Kind of negative electrode | Specific gravity of electrolyte | 5 sec charge current Initial stage | 5 sec charge current after 5000 cycles | Cycle Characteristic | Evaluation | Remarks |
|---|---|---|---|---|---|---|---|---|
| 1 | 4.5 m$^2$/g | B | 1.30 | 120 | 95 | 185 | — | Existent example |
| 2 | 5.5 | | | 145 | 101 | 192 | ○ | Example |
| 3 | 7.5 | | | 160 | 104 | 197 | ○ | |
| 4 | 9.4 | | | 178 | 108 | 202 | ◉ | |
| 5 | 11.0 | | | 190 | 113 | 205 | ◉ | |
| 6 | 13.0 | | | 196 | 114 | 207 | ◉ | |
| 7 | 14.1 | | | 203 | 114 | 180 | ○ | |

It can be seen from the result described above that the 5 sec charge current (charge acceptance) and the cycle characteristic (life performance under PSOC) can be improved greatly than those of the existent example in Table 3 even when the specific surface area of the positive electrode active material regarding the discharge reaction is 4.5 m$^2$/g, by using the compound containing the condensate of [Chem. 2] as the main ingredient for the organic compound for suppressing growing of the negative electrode active material. Further, the 5 sec charge current and the cycle characteristic can be improved distinctly by increasing the specific surface area of the positive electrode active material to 5.5 mm$^2$/g or more compared with the case where the specific surface area is 4.5 m$^2$/g. The 5 sec charge current and the cycle characteristic are gradually saturated as the specific surface area of the positive electrode active material is increased and, when the specific surface area of the positive electrode active material reaches 14.1 m$^2$/g, the cycle characteristic tends to be lowered compared with the case where the specific surface area of the positive electrode active material is 13.0 mm$^2$/g.

The 5 sec charge current and the cycle characteristic show the best result by defining the specific surface area of the positive electrode active material to 9.4 m$^2$/g or more and 13 m$^2$/g or less.

When Table 2 and Table 4 are compared, the effect of the carbonaceous electroconductive material added to the negative electrode can be seen. That is, under the condition of using the condensate of the [Chem. 2] as the main ingredient for the organic compound for suppressing growing of the negative electrode active material, Table 4 shows the result of adding the natural flake graphite by 2 mass parts and Table 2 shows the result of adding the carbon black by 0.2 mass parts.

Since the natural flake graphite has a feature that the paste property is not changed (hardened) even when the addition amount is increased, the amount can be increased easily and this example shows a case where it is added by 2 mass parts.

It is shown that when the natural flake graphite is added by 2 mass parts, while there is no significant difference for the 5 sec charge current in the initial stage, the 5 sec charge current and the cycle characteristic after 5,000 cycles can be improved further greatly compared with the case of adding the carbon black by 0.2 mass parts.

It is considered that the difference is attributable to the result that charging can be performed more easily since the natural flake graphite as the carbonaceous electroconductive material has lower resistance value and can be added by more amount compared with the carbon black.

TABLE 3

| No. | Specific surface area of positive electrode active material | Kind of negative electrode | Specific gravity of electrolyte | 5 sec charge current Initial stage | 5 sec charge current after 5000 cycles | Cycle Characteristic | Evaluation | Remarks |
|---|---|---|---|---|---|---|---|---|
| 1 | 4.5 m$^2$/g | A | 1.30 | 100 | 50 | 100 | Reference | Existent example |
| 2 | 5.5 | | | 101 | 52 | 105 | ○ | Example |
| 3 | 7.5 | | | 102 | 54 | 108 | ○ | |
| 4 | 9.4 | | | 103 | 55 | 110 | ○ | |
| 5 | 11.0 | | | 104 | 56 | 115 | ○ | |
| 6 | 13.0 | | | 104 | 56 | 109 | ○ | |
| 7 | 14.1 | | | 104 | 56 | 100 | ○ | |

It can be seen from the result described above that the 5 sec charge current and the cycle characteristic can be improved also in a case of using the compound containing sodium lignin sulfonate of the [Chem. 3] as a main ingredient for the organic compound for suppressing growing of the negative electrode active material, by adjusting the specific surface area of the positive electrode active material to 5.5 m$^2$/g or more compared with the case of the specific surface area at 4.5 m$^2$/g. Also in this case, the 5 sec charge current and the cycle characteristic tend to be saturated as the specific surface area of the positive electrode active material is increased.

Also in this case, the 5 sec charge current and the cycle characteristic can be improved more by increasing the specific surface area of the positive electrode active material to 5.5 m$^2$/g or more compared with the case where the specific surface area is 4.5 m$^2$/g. However, the 5 sec charge current and the cycle characteristic are gradually saturated as the specific surface area of the positive electrode active material is increased and, when the specific surface area of the positive electrode active material reaches 14.1 m$^2$/g, the cycle characteristic tends to be lowered compared with the case where the specific surface area of the positive electrode active material is 13.0 m$^2$/g.

TABLE 4

| No. | Specific surface area of positive electrode active material | Kind of negative electrode | Specific gravity of electrolyte | 5 sec charge current Initial stage | 5 sec charge current after 5000 cycles | Cycle characteristic | Evaluation | Remarks |
|---|---|---|---|---|---|---|---|---|
| 1 | 4.5 m$^2$/g | C | 1.30 | 121 | 99 | 225 | — | Reference example |
| 2 | 5.5 | | | 144 | 105 | 232 | ◎ | Example |
| 3 | 7.5 | | | 161 | 109 | 237 | ◎ | |
| 4 | 9.4 | | | 177 | 112 | 241 | ◎ | |
| 5 | 11.0 | | | 191 | 117 | 244 | ◎ | |
| 6 | 13.0 | | | 195 | 118 | 246 | ◎ | |
| 7 | 14.1 | | | 203 | 118 | 219 | ◎ | |

TABLE 5

| No. | Specific surface area of positive electrode active material | Kind of negative electrode | Specific gravity of electrolyte | 5 sec charge current Initial stage | 5 sec charge current after 5000 cycles | Cycle characteristic | Remarks |
|---|---|---|---|---|---|---|---|
| 1 | 4.5 m²/g | B' With no addition of carbonaceous electro-conductive material | 1.30 | 118 | 53 | 112 | Comparative Example |
| 2 | 5.5 | | | 143 | 55 | 114 | |
| 3 | 7.5 | | | 158 | 56 | 116 | |
| 4 | 9.4 | | | 176 | 57 | 119 | |
| 5 | 11.0 | | | 188 | 58 | 121 | |
| 6 | 13.0 | | | 194 | 58 | 116 | |
| 7 | 14.1 | | | 201 | 58 | 109 | |

Table 5 shows examples of not adding the carbonaceous electroconductive material as comparative examples. It can be seen from the result described above that the 5 sec charge current and the cycle characteristic can be improved greatly in the initial stage compared with the existent example even in a case of not adding the carbonaceous electroconductive material to the negative electrode active material, when using the condensate of the [Chem. 2] as the main ingredient for the organic compound for suppressing growing of the negative electrode active material. Also in this case, the 5 sec charge current and the cycle characteristic can be improved by increasing the specific surface area of the positive electrode active material to 5.5 m²/g or more compared with the case of the specific surface area at 4.5 m²/g. However, the 5 sec charge current and the cycle characteristic gradually tend to be saturated as the specific surface area of the positive electrode active material is increased.

Further, the 5 sec charge current value in the initial stage has no remarkable difference from the cases of Table 2 and Table 4. However, since the carbonaceous electroconductive material having an effect of finely dispersing lead sulfate formed to the negative electrode active material during discharging is not added to the negative electrode active material, the cycle characteristic is remarkably poor compared with the cases of Table 2 and Table 4. That is, although the charge acceptance in the initial stage is preferred, the preferred state cannot be maintained over the charge and discharge cycle and since the charge acceptance is lowered accompanying the progress of the charge and discharge cycle, the cycle characteristic is deteriorated. Even when the specific surface area of the active material of the positive electrode plate is adjusted properly, the cycle characteristic cannot be improved unless the carbonaceous electroconductive material is added.

It can be seen from the result shown in Table 2 to Table 5 that when the specific surface area of the positive electrode active material regarding the discharge reaction is increased to 5.5 m²/g or more, the 5 sec charge current can be improved, although the extent is different, compared with the case where the specific surface area of the positive electrode active material is 4.5 m²/g.

On the other hand, the number of cycles gradually tends to be lowered as the specific surface area of the positive electrode active material is higher and when the specific surface area of the positive electrode active material exceeds 13 m²/g, the number of cycles is shortened. This is caused by the occurrence of the phenomenon referred to as softening in which the structure of the active materials was collapsed by the repetitive charge and discharge because the porosity of the active material becomes excessively large. In view of the above, it is considered that the specific surface area of the positive electrode active material regarding the discharge reaction is preferably within a range of 13 m²/g or less.

For further confirming the softening of the positive electrode active material, instead of the test for the life mode caused by the growing or sulfation of the negative electrode active material described so far, a deep cycle endurance test (cycle test including discharging at 0.2C current for one hour and then charging at 0.2C current for 1.25 hours as one cycle) was performed on each of the valve-regulated lead-acid batteries in Table 2, Table 3, and Table 4. This is a cycle test showing that the discharging becomes impossible and the life is exhausted by the softening of the positive electrode active material. The life is regarded to be completed when the voltage in discharging at one hour lowers to less than 10.2 V. Table 6 shows the result of the test with reference to the life of using a positive electrode plate at a specific surface area of 4.5 m²/g being assumed as 100.

The test result is identical also in any of the cases using the positive electrode plates A, B, and C.

TABLE 6

| No. | Specific surface area of positive electrode active material | Cycle characteristic |
|---|---|---|
| 1 | 4.5 m²/g | 100 |
| 2 | 5.5 | 100 |
| 3 | 7.5 | 100 |
| 4 | 9.4 | 99 |
| 5 | 11.0 | 97 |
| 6 | 13.0 | 95 |
| 7 | 14.1 | 79 |

It can be seen from the result described above that lowering of the cycle characteristic increases when the specific surface area of the positive electrode material exceeds 13 m²/g. When this is combined with the result of Tables 2 to 4, it is considered that the specific surface area of the positive electrode active material is preferably 13 m²/g or less also in view of the use of a deep cycle endurance.

It can be judged from the cycle characteristic shown in each of Tables 2 to 4 that the life mode is attributable mainly to the growing and sulfation of the negative electrode active material in a region where the specific surface area of the positive electrode active material is large and this shifts to the life mode attributable to the softening of the positive electrode active material as the specific surface area of the active material is larger.

However, when the negative electrode plates B and C are used, a cycle characteristic about twice as large as the existent example is obtained (Table 2 and Table 4) being coupled with the effect of improving the charge acceptance of the negative electrode plate even when the specific surface area of the positive electrode active material exceeds 13 m²/g. As described above, it has been found that the charge acceptance and the life performance of the battery can be improved by using the negative electrode plate improved for the charge acceptance and increasing the specific surface area of the active material of the positive electrode plate regarding the discharge reaction.

Table 7 shows the result of the measurement for the 5 sec charge current and the result of the measurement for the cycle characteristic performed on the valve-regulated lead-acid batteries having the configuration of the type 5 electrode plate group. In Table 7, specific gravity of the electrolyte of 1.30 to 1.35 are for examples and the specific gravity of the electrolyte of 1.25 and 1.40 to 1.46 are for comparative examples. The 5 sec charge current and the cycle characteristic shown in Table 7 are evaluated with reference to the existent example in Table 3 being assumed as 100 (100 in the initial state for the 5 sec charge current).

above, and the solubility of lead sulfate to the electrolyte is decreased as the specific gravity of the sulfuric acid, i.e., the electrolyte is higher thereby lowering the charge acceptance.

When the specific gravity of the electrolyte is less than 1.30, the capacity is lowered while the charge acceptance and the cycle characteristic are improved and this results in a problem of incapable of satisfying the initial stage performance (5HR capacity 23 Ah) as the reference of this example and, accordingly, they are evaluated as "X".

While the condensate in which the p-aminobenzene sulfonic acid group is bonded to the benzene ring of bisphenols has a particularly high effect, a comparable effect is obtainable by condensates in which a sulfonic group is bonded to the benzene ring of the bisphenols.

Next, in the No. 5 type lead-acid battery in Table 4, the average primary particle diameter of the natural flake graphite was changed and the effect of the average primary particle diameter on the battery characteristic is confirmed. The con-

TABLE 7

| No. | Specific surface area of positive electrode active material | Kind of negative electrode | Specific gravity of electrolyte | 5 sec charge current Initial stage | 5 sec charge current After 5000 cycles | Cycle characteristic | 5 HR capacity (AH) | Evaluation | Remarks |
|---|---|---|---|---|---|---|---|---|---|
| 1 | 4.5 m²/g | A | 1.30 | 100 | 50 | 100 | 23 | Reference | Existent example |
| 2 | 11.0 m²/g | A | 1.25 | 110 | 58 | 118 | 21 | X | Comp. Example |
| 3 | | | 1.30 | 104 | 56 | 115 | 24 | ○ | Example |
| 4 | | | 1.33 | 102 | 49 | 100 | 25 | ○ | |
| 5 | | | 1.35 | 100 | 42 | 85 | 26 | ○ | |
| 6 | | | 1.40 | 54 | 30 | 43 | 25 | X | Comp. Example |
| 7 | | | 1.46 | 20 | 24 | 30 | 24 | X | |
| 8 | | B | 1.25 | 195 | 116 | 208 | 21 | X | Comp. Example |
| 9 | | | 1.30 | 190 | 113 | 205 | 24 | ◎ | Example |
| 10 | | | 1.33 | 148 | 108 | 158 | 25 | ◎ | |
| 11 | | | 1.35 | 105 | 103 | 110 | 26 | ◎ | |
| 12 | | | 1.40 | 62 | 66 | 64 | 25 | X | Comp. Example |
| 13 | | | 1.46 | 21 | 25 | 30 | 24 | X | |
| 14 | | C | 1.25 | 196 | 120 | 247 | 21 | X | Comp. Example |
| 15 | | | 1.30 | 191 | 117 | 244 | 24 | ◎ | Example |
| 16 | | | 1.33 | 149 | 112 | 198 | 25 | ◎ | |
| 17 | | | 1.35 | 106 | 107 | 150 | 26 | ◎ | |
| 18 | | | 1.40 | 61 | 67 | 70 | 25 | X | Comp. Example |
| 19 | | | 1.46 | 21 | 25 | 30 | 24 | X | |

It can be seen from the result described above that the 5 sec charge current and the cycle characteristic are more excellent over the reference when the specific gravity of the electrolyte is 1.30 to 1.35 in a case of using any of the negative electrode plates A, B, and C. When the specific gravity of the electrolyte exceeds 1.35, since the 5 sec charge current lowers greatly, they are evaluated as "X". This is because the dissolution rate of lead sulfate to the electrolyte is a rate-determining step in the charge acceptance of the valve-regulated lead-acid battery in view of the principle of the charge reaction as described figuration of the electrode plate group was identical with that of No. 5 type in Table 4 except for changing the average primary particle diameter of the natural flake graphite as 80 μm, 100 μm, 120 μm, 140 μm, 180 μm, and 220 μm. Table 8 shows the result of evaluation for the 5 sec charge current and the cycle characteristic. The 5 sec charge current and the cycle characteristic shown in the table are evaluated in the same manner as in Tables 2 to 5 with reference to the existent example in Table 3 being assumed as 100 (100 in the initial stage for 5 sec charge current).

TABLE 8

| No. | Specific surface area of positive electrode active material | Kind of negative electrode | Specific gravity of electrolyte | Average primary particle, diameter of graphite (μm) | 5 sec charge current Initial stage | 5 sec charge current After 5000 cycles | Cycle characteristic | Remarks |
|---|---|---|---|---|---|---|---|---|
| 1 | 11.0 m²/g | C | 1.30 | 80 | 160 | 52 | 97 | Example |
| 2 | | | | 100 | 171 | 74 | 170 | |

TABLE 8-continued

| No. | Specific surface area of positive electrode active material | Kind of negative electrode | Specific gravity of electrolyte | Average primary particle, diameter of graphite (μm) | 5 sec charge current Initial stage | 5 sec charge current After 5000 cycles | Cycle characteristic | Remarks |
|---|---|---|---|---|---|---|---|---|
| 3 | | | | 120 | 176 | 83 | 188 | |
| 4 | | | | 140 | 181 | 95 | 207 | |
| 5 | | | | 180 | 191 | 117 | 244 | |
| 6 | | | | 220 | 191 | 117 | 244 | |

It can be seen from the result of Table 8 that the 5 sec charge current in the initial stage is increased more and the cycle characteristic is also improved as the average primary particle diameter of graphite is larger. This trend is remarkable in a range of the average primary particle diameter of graphite of 100 μm or more and the effect is small at 80 μm. This is because the electric resistance increases at the point of contact of graphite when the average primary particle diameter thereof is small. As the average primary particle diameter is larger, the electric resistance is lowered and the charge characteristic and the cycle life are improved.

In view of the result described above, the average primary particle diameter of the natural flake graphite is preferably within a range of 100 μm or more. However, when the average primary particle diameter of the flake graphite is larger than 220 μm, although the effect was obtained for the charge acceptance, bonding between the collector and the negative electrode active material is weakened and the negative electrode active material tends to be defoliated from the collector. Accordingly, with the practical point of view, a flake graphite with an average primary particle diameter of 220 μm or less is preferably used. Further, since the yield is poor and the availability is low for those having the average primary particle diameter of larger than 180 μm because they are natural products, an optimal average primary particle diameter is 180 μm.

In the existent valve-regulated lead-acid battery, efforts have been directed exclusively to the improvement of the charge acceptance and the life performance of the negative electrode plate upon improvement of the charge acceptance but consideration has not been taken for the improvement of the charge acceptance by improving the performance of the positive electrode plate. Accordingly, the charge acceptance of the entire valve-regulated lead-acid battery has been determined so far depending on the charge acceptance of the negative electrode and this has imposed a limit for the improvement of the charge acceptance of the valve-regulated lead-acid battery. According to an aspect of the present invention, the charge acceptance of the entire battery can be further improved than usual by improving the performance of the positive electrode active material while taking notice on the performance of the positive electrode active material in order to break down the limit described above.

While it has been intended to improve the charge acceptance only by improving the characteristic of the negative electrode in the related art, the charge acceptance of the positive electrode plate is improved by increasing the specific surface area of the positive electrode active material regarding the discharge reaction, whereby the charge acceptance of the entire battery can be improved more than usual to enable discharging at a further higher rate under PSOC according to the invention. Further, according to the invention, since the charge acceptance of the valve-regulated lead-acid battery can be improved thereby capable of preventing repetitive charge and discharge in an insufficient state of charge, growing of lead sulfate as the discharging product by repetitive charge and discharge in the insufficient state of charge can be prevented thereby capable of improving the life performance of the valve-regulated lead-acid battery under PSOC. This is a significant advance for the valve-regulated lead-acid battery used under PSOC and greatly contributes to the improvement of the performance of the valve-regulated lead-acid battery mounted, for example, on micro hybrid vehicles.

Industrial Applicability

As has been described above, the present invention can provide a valve-regulated lead-acid battery improved for the charge acceptance and the life performance under PSOC than usual and contributes to popularization of micro hybrid vehicles such as ISS vehicles and generation control vehicles. Accordingly, the present invention contributes to the solution of the global subject of reducing the releasing amount of carbonic acid gas by the improvement of the fuel-efficient in automobile thereby suppressing the global warming and has a remarkable industrial applicability.

The invention claimed is:

1. A valve-regulated lead-acid battery in which an electrode plate group formed by stacking negative electrode plates each having a negative electrode active material filled to a negative electrode collector and positive electrode plates each having a positive electrode active material filled to a positive electrode collector by way of retainers is contained together with an electrolyte in a battery case, and charging is performed intermittently and high rate discharging to a load is performed in a partial state of charge, wherein the negative electrode active material contains flaky graphite and a formaldehyde condensate of bisphenols and aminobenzene sulfonic acid in the negative electrode active material, the flaky graphite having an average primary particle diameter of 100 μm or more and 220 μm or less, the positive electrode plate comprises a positive electrode plate having a specific surface area of an active material of 5.5 m$^2$/g or more, and the electrolyte has a specific gravity in a range of 1.30 or more and 1.35 or less.

2. A valve-regulated lead-acid battery according to claim 1, wherein the positive electrode plate has a specific surface area of the active material of 13 m$^2$/g or less.

3. A valve-regulated lead-acid battery according to claim 1, wherein the formaldehyde condensate of bisphenols and aminobenzene sulfonic acid is a formaldehyde condensate of bisphenol A and aminobenzene sulfonic acid represented by the chemical structural formula of the following [Chem. 1], and the positive electrode plate has the specific surface area of the active material in a range from 9.4 m$^2$/g or more and 13 m$^2$/g or less:

[Chem. 1]
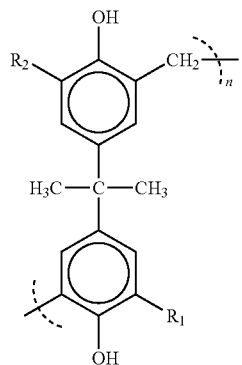
$R_1$, $R_2$ represent each hydrogen or
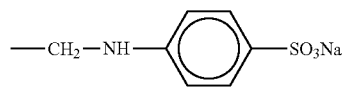
(excluding a case where both $R_1$ and $R_2$ are hydrogen).
* * * * *